United States Patent
Kell et al.

(10) Patent No.: US 10,972,419 B2
(45) Date of Patent: Apr. 6, 2021

(54) ARCHIVING MESSAGES WITHOUT MESSAGE COPYING

(71) Applicant: Telefonaktiebolaget LM Ericsson (publ), Stockholm (SE)

(72) Inventors: Dave Kell, New Westminster (CA); Patrice Varinot, Montreal (CA); Fei Wang, Ile-Bizard (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 141 days.

(21) Appl. No.: 15/776,600

(22) PCT Filed: Nov. 17, 2015

(86) PCT No.: PCT/IB2015/058904
§ 371 (c)(1),
(2) Date: May 16, 2018

(87) PCT Pub. No.: WO2017/085531
PCT Pub. Date: May 26, 2017

(65) Prior Publication Data
US 2018/0351900 A1 Dec. 6, 2018

(51) Int. Cl.
*H04L 12/58* (2006.01)
*H04W 4/12* (2009.01)

(52) U.S. Cl.
CPC .............. *H04L 51/22* (2013.01); *H04L 51/36* (2013.01); *H04L 51/38* (2013.01); *H04W 4/12* (2013.01)

(58) Field of Classification Search
CPC ......... H04L 51/22; H04L 51/36; H04L 51/38; H04W 4/12
See application file for complete search history.

(56) References Cited

U.S. PATENT DOCUMENTS

| | | | |
|---|---|---|---|
| 6,385,389 B1* | 5/2002 | Maruyama | G11B 27/036 386/248 |
| 6,725,228 B1* | 4/2004 | Clark | G06Q 10/107 |
| 7,730,148 B1 | 6/2010 | Mace et al. | |

(Continued)

FOREIGN PATENT DOCUMENTS

| WO | 2009104860 A1 | 8/2009 |
|---|---|---|
| WO | 2017144951 A1 | 8/2017 |

OTHER PUBLICATIONS

Author Unknown, "Rich Communication Suite 5.3 Endorsement of OMA CPM 2.0 Message Storage," Official Document RCC.09, Version 5.0, Feb. 28, 2015, GSM Association, 22 pages.

(Continued)

*Primary Examiner* — Sm A Rahman
(74) *Attorney, Agent, or Firm* — Patent Portfolio Builders, PLLC

(57) ABSTRACT

Systems and methods relating to archiving a message in a message store and synchronizing the message store across multiple client devices of the same user are disclosed. In some embodiments, a method of operation of a client device for archiving messages in a message store managed by a server comprises making a determination at the client device to archive a message that is stored in a first mailbox of the message store and, upon making the determination, sending an instruction to the server to set an Archived flag for the message. In this manner, the message is archived without copying or moving the message to a secondary mailbox, which in turn simplifies both the archiving process and subsequent synchronization across other client devices of the same user.

23 Claims, 13 Drawing Sheets

(56) References Cited

U.S. PATENT DOCUMENTS

| | | | | |
|---|---|---|---|---|
| 8,620,869 | B2* | 12/2013 | Consul | G06Q 10/107 |
| | | | | 707/662 |
| 9,311,121 | B2* | 4/2016 | Deshpande | G06F 9/45533 |
| 2005/0055519 | A1* | 3/2005 | Stuart | G06F 16/125 |
| | | | | 711/159 |
| 2008/0177845 | A1 | 7/2008 | Bracewell et al. | |
| 2008/0215684 | A1 | 9/2008 | Thorkelsson et al. | |
| 2008/0250084 | A1 | 10/2008 | Polimeni | |
| 2009/0031006 | A1* | 1/2009 | Johnson | G06F 16/972 |
| | | | | 709/218 |
| 2011/0016057 | A1* | 1/2011 | Halpern | G06Q 30/00 |
| | | | | 705/326 |
| 2012/0149342 | A1 | 6/2012 | Cohen et al. | |
| 2014/0172993 | A1 | 6/2014 | Ordogh | |
| 2015/0212889 | A1* | 7/2015 | Amarendran | G06F 11/1448 |
| | | | | 707/674 |
| 2015/0341300 | A1 | 11/2015 | Swain et al. | |
| 2016/0269335 | A1 | 9/2016 | Kell | |
| 2019/0104096 | A1 | 4/2019 | Kell et al. | |

OTHER PUBLICATIONS

Author Unknown, "Rich Communication Suite 5.3 Advanced Communications Services and Client Specification," Official Document RCC.07, Version 6.0, Feb. 28, 2015, GSM Association, 546 pages.

Author Unknown, "CPM Message Storage," Draft Version 2.0, Open Mobile Alliance Ltd., OMA-TS-CPM_MessageStorage-V2_0-20130723-D, Jun. 23, 2013, 48 pages.

Author Unknown, "CPM Message Storage," Candidate Version 2.0, Open Mobile Alliance Ltd., OMA-TS-CPM_Message_Storage-V2_0-20150113-C, Jan. 13, 2015, 55 pages.

Author Unknown, "Dictionary for OMA Specifications," Approved Version 2.9, Open Mobile Alliance Ltd., OMA-ORG--Dictionary-V2_9-20120626-A, Jun. 26, 2012, 46 pages.

Author Unknown, "OMA Converged IP Messaging System Description," Candidate Version 2.0, Open Mobile Alliance Ltd., OMA-TS-CPM_System_Description-V2_0-20150113-C, Jan. 13, 2015, 132 pages.

Crispin, M., "Internet Message Access Protocol—Version 4rev1 (IMAPv4)," Network Working Group, Request for Comments: 3501, Obsoletes: 2060, Category: Standards Track, The Internet Society, Mar. 2003, 108 pages.

Gordon, W., "How to Use Gmail as Your Central, Universal Communications Hub," lifehacker, Dec. 15, 2010, "https://lifehacker.com/5713726/how-to-use-gmail-as-your-central-universal-communications-hub," retrieved Jan. 18, 2016, 10 pages.

Gossage, M., "Optimizing Outlook 2007 Cache Mode Performance for a Very Large Mailbox," The Exchange Team Blog, TechNet Blogs, Dec. 17, 2007, http://blogs.technet.com/b/exchange/archive/2007/12/17/3404552.aspx, retrieved Nov. 6, 2015, 7 pages.

Last Name Unknown, Jonathan, "What are the default special folder names for IMAP accounts in Mail.app (like Drafts, Junk, Sent)?" AskDifferent, Stack Exchange, Oct. 13, 2013, https://apple/stackexchange.com/questions/105145/what-are-the-default-special-folder-names-for-imap-accounts-in-mail-app-like-dr/105145, retrieved May 15, 2018, 2 pages.

Leiba, B. et al., "IMAP LIST Extension for Special-Use Mailboxes," Internet Engineering Task Force (IETF), Request for Comments: 6154, Category: Standards Track, ISSN: 2070-1721, Mar. 2011, 12 pages.

Leiba, B. et al., "Internet Message Access Protocol version 4—LIST Command Extensions," Internet Engineering Task Force (IETF), Network Working Group, Request for Comments: 5258, Obsoletes: 3348, Updates: 2193, Category: Standards Track, The Internet Society, Jun. 2008, 31 pages.

Melnikov, A. et al., "Collected Extensions to IMAP4 ABNF," Internet Engineering Task Force (IETF), Request for Comments: 4466, Updates: 2088, 2342, 3501, 3502, 3516, Category: Standards Track, Apr. 2006, 17 pages.

Melnikov, A. et al., "IMPA Extensions: Quick Flag Changes Resynchronization (CONDSTORE) and Quick Mailbox Resynchronization (QRESYNC)," Internet Engineering Task Force (IETF), Request for Comments: 7162, Obsoletes: 4551, 5162, Updates: 2683, Category: Standards Track, ISSN: 2070-1721, May 2014, 52 pages.

Melnikov, A. et al., "IMAP4 Extension for Returning STATUS Information in Extended LIST," Internet Engineering Task Force (IETF), Request for Comments: 5819, Category: Standards Track, ISSN: 2070-1721, Mar. 2010, 6 pages.

Melnikov, A. et al., "IMAP4 Keyword Registry," Internet Engineering Task Force (IETF), Request for Comments: 5788, Category: Standards Track, ISSN: 2070-1721, Mar. 2010, 11 pages.

International Search Report and Written Opinion for International Patent Application No. PCT/IB2015/058904, dated May 9, 2016, 12 pages.

International Search Report and Written Opinion for International Patent Application No. PCT/IB2016/051036, dated Nov. 23, 2016, 13 pages.

Author Unknown, "Technical Specification Group Core Network and Terminals; IP multimedia call control protocol based on Session Initiation Protocol (SIP) and Session Description Protocol (SDP); Stage 3 (Release 15)," Technical Specification 24.229, Version 15.3.0, 3GPP Organizational Partners, Jun. 2018, 1019 pages.

Author Unknown, "CPM Message Storage using RESTFul API," Draft Version 2.0, Open Mobile Alliance Ltd., OMA-TS-CPM_Message_Storage_Using_RESTFul_API-V2_0-20180510-D, May 10, 2018, 44 pages.

Daboo, C. et al., "Internet Message Access Protocol—Annotate Extension," Internet Engineering Task Force (IETF), Network Working Group, Request for Comments: 5257, Jun. 2008, 31 pages.

Daboo, C., "The IMAP Metadata Extension," Internet Engineering Task Force (IETF), Network Working Group, Request for Comments: 5464, Feb. 2009, 21 pages.

Rosenberg, J. et al., "SIP: Session Initiation Protocol," Internet Engineering Task Force (IETF), Request for Comments: 3261, Categorgy: Standards Track, Jun. 2002, 269 pages.

Office Action issued in corresponding EP Application No. 15805291.0 dated Apr. 30, 2020, 06 Pages. All references cited therein have previously been made of record.

* cited by examiner

ARCHIVING MESSAGES WITHOUT MESSAGE COPYING

This application is a 35 U.S.C. § 371 national phase filing of International Application No. PCT/IB2015/058904, filed Nov. 17, 2015, the disclosure of which is incorporated herein by reference in its entirety.

TECHNICAL FIELD

The present disclosure relates to archiving messages in a message store such as, e.g., a Common Message Store (CMS) for Rich Communication Services (RCS)/Converged Internet Protocol Messaging (CPM).

BACKGROUND

The Rich Communication Services (RCS) program is a Global System for Mobile Communications, originally Groupe Speciale Mobile, (GSM) Association (GSMA) program for the creation of inter-operator communication services based on Internet Protocol (IP) Multimedia Subsystem (IMS). RCS is a platform that enables the delivery of communication experiences beyond voice and Short Message Service (SMS). In particular, RCS provides users with services, such as instant messaging or chat, live video, and filing sharing, across various devices on any network. Among other things, the RCS architecture includes an IMS core including a Common Message Store (CMS). RCS has endorsed Open Mobile Alliance (OMA) Converged IP Messaging (CPM) and, as such, the CMS is sometimes referred to herein as an OMA CPM message store (or simply a CPM message store) or a CPM/RCS message store. The details of the RCS architecture and RCS in general are currently specified in "Rich Communication Suite 5.3 Advanced Communications Services and Client Specification" Version 6.0 (Feb. 28, 2015). The details of the OMA CPM message store are currently specified in "CPM Message Storage" Candidate Version 2.0 (Jan. 13, 2015).

For a particular user, the OMA CPM message store as endorsed by RCS includes a "Default" mailbox or folder as well as an "RCSMessageStore" mailbox or folder (see, for example, "Rich Communication Suite 5.3 Endorsement of OMA CPM 2.0 Message Storage" Version 5.0 (Feb. 28, 2015). These mailboxes are synchronized across multiple client devices of the user. Messages in the Default mailbox are normally expunged after expiry of a predefined amount of time. However, messages in the Default mailbox can be preserved from scheduled expiry by copying or moving them to the RCSMessageStore mailbox. This preservation of the messages is referred to herein as "archiving" the messages.

IMS supports the exchange of media and text between endpoints via various protocols. When Internet Message Access Protocol (IMAP) is used to synchronize between multiple clients in near real time, a discrepancy of the views between clients for the same conversation may occur. Currently, synchronization between clients requires synchronizing to the RCSMessageStore mailbox when, for archival, a message is copied from the Default mailbox to the RCSMessageStore mailbox and deleted from the Default mailbox. Since information about the message that was moved from the Default mailbox to the RCSMessageStore mailbox for archival is missing, synchronization is still required at least once per day per client, in order for the client to be aware of these changes. The client keeps only one copy of the archived message, but the client has to find the archived message in the RCSMessageStore mailbox in near real time in order to be synchronized across client devices.

The current archiving process and subsequent synchronization of the message store for CPM/RCS across multiple client devices of the user is less than optimal. As such, there is a need for systems and methods for improved archiving of messages in a message store and subsequent synchronization across multiple client devices of the user.

SUMMARY

Systems and methods relating to archiving a message in a message store and synchronizing the message store across multiple client devices of the same user are disclosed. In some embodiments, a method of operation of a client device for archiving messages in a message store managed by a server comprises making a determination at the client device to archive a message that is stored in a first mailbox of the message store and, upon making the determination, sending an instruction to the server to set an Archived flag for the message. In this manner, the message is archived without copying or moving the message to a secondary mailbox, which in turn simplifies both the archiving process and subsequent synchronization across other client devices of the same user.

In some embodiments, the message store is a Common Message Store (CMS) and the server is a CMS server. In some embodiments, the CMS is a Converged Internet Protocol Messaging (CPM)/Rich Communication Services (RCS) message store. In some embodiments, the Archived flag is a message-specific Archived flag. In some embodiments, the Archived flag is a permanent flag.

In some embodiments, sending the instruction to the server to set the Archived flag for the message comprises sending the instruction to the server to set the Archived flag for the message without sending an instruction to the CPM server to copy or move the message from the first mailbox of the message store to a second mailbox of the message store.

In some embodiments, the first mailbox is a Default mailbox. In some embodiments, the message store is a CPM/RCS message store, and sending the instruction to the server to set the Archived flag for the message comprises sending the instruction to the server to set the Archived flag for the message without sending an instruction to the server to copy or move the message from the Default mailbox of the message store to an RCSMessageStore mailbox of the message store.

In some embodiments, the method further comprises making a determination to delete a previously archived message, the previously archived message being a message having an Archived flag that is set. The method further comprises, upon making the determination to delete the previously archived message, sending an instruction to the server to both set a deleted flag for the previously archived message and clear the Archived flag for the previously archived message. In some embodiments, the client device does not send an instruction to the server to expunge deleted messages from the first mailbox or to specifically expunge the previously archived message. In some embodiments, the previously archived message is the message. In other embodiments, the previously archived message is a message in the first mailbox other than the message.

Embodiments of a client device that operates according to any of the embodiments of the method of operation of a client device above are also disclosed.

In some embodiments, a method of operation of a client device for synchronizing messages in a message store managed by a server comprises updating a local copy of the message store with changed message-specific flags, the local copy of the message store comprising a Default mailbox and the changed message-specific flags comprising an Archived flag for a respective message in the Default mailbox, and fetching one or more new messages from the message store. In this manner, the client device must only synchronize the Default mailbox to obtain synchronization for both non-archived and archived messages as opposed to conventional synchronization which requires synchronization of multiple different mailboxes.

In some embodiments, the message store is a CMS, and the server is a CMS server. In some embodiments, the CMS is a CPM/RCS message store. In some embodiments, the Archived flag is a message-specific Archived flag for the respective message. In some embodiments, the Archived flag is a permanent flag.

In some embodiments, the message store is a CPM/RCS message store, and the local copy of the CPM/RCS message store does not comprise a local copy of an RCSMessageStore mailbox. In some embodiments, the CPM/RCS message store does not comprise an RCSMessageStore mailbox.

In some embodiments, the method further comprises storing any messages that exist locally at the client device but cannot be found in the message store onto the message store in the Default mailbox.

Embodiments of a client device that operates according to any of the embodiments of the method of operation of a client device above are also disclosed.

In some embodiments, a method of operation of a server system implementing a message store comprises receiving, from a first client device, an instruction to set an Archived flag for a message that is stored in a first mailbox of the message store and storing the Archived flag for the message.

In some embodiments, the message store is a CMS, and the server is a CMS server. In some embodiments, the CMS is a CPM/RCS message store. In some embodiments, the Archived flag is a message-specific Archived flag. In some embodiments, the Archived flag is a permanent flag.

In some embodiments, receiving the instruction to set the Archived flag for the message comprises receiving the instruction to set the Archived flag for the message without receiving, from the first client device, an instruction to copy or move the message from the first mailbox of the message store to a second mailbox of the message store.

In some embodiments, the first mailbox is a Default mailbox. Further, in some embodiments, the message store is a CPM/RCS message store, and receiving the instruction to set the Archived flag for the message comprises receiving the instruction to set the Archived flag for the message without receiving, from the first client device, an instruction to copy or move the message from the Default mailbox of the CPM/RCS message store to an RCSMessageStore mailbox of the CPM/RCS message store. Further, in some embodiments, the server system does not expunge the message from the Default mailbox even after an expiry period has expired for the message.

In some embodiments, the method further comprises synchronizing the message store with a second client device. Further, in some embodiments, the message store is a CPM/RCS message store, the first mailbox is a Default mailbox, and the message store does not comprise an RCSMessageStore mailbox.

Embodiments of a server system that operates according to any of the embodiments of the method of operation of a server system described above are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
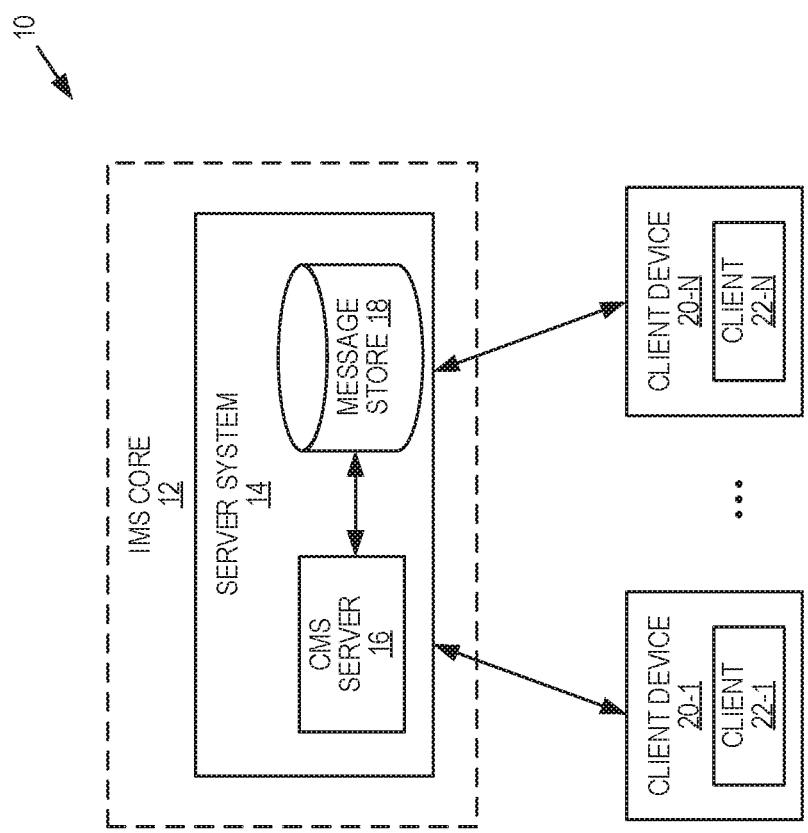
FIG. 1 illustrates a system including a message store (e.g., a Common Message Store (CMS)) and a number of client devices where, as described with respect to, e.g., FIGS. 5-7, messages are archived utilizing an Archived flag rather than a copy or move of the message to a secondary mailbox according to some embodiments of the present disclosure.

Systems and methods are disclosed herein relating to archiving messages in a Converged Internet Protocol (IP) Messaging (CPM) message store and synchronization of the CPM message store across multiple client devices of a user. In this regard, FIG. 1 illustrates a system 10 implementing one example of a Rich Communication Services (RCS) architecture according to some embodiments of the present disclosure. It should be appreciated that the RCS architecture may be much more complex and include additional components. However, the RCS architecture of the system 10 of FIG. 1 is intended as an example used to illustrate embodiments of the present disclosure. Also, it should be noted that while the discussion herein focuses on RCS/CPM, the present disclosure is equally applicable to other types of systems in which there is a common message store.

As illustrated, the system 10 includes an IP Multimedia Subsystem (IMS) core 12 including a server system 14. Notably, RCS supports operation across multiple IMS cores 12 of multiple service providers. The server system 14 includes a Common Message Store (CMS) server 16 that operates to maintain, in this example, a message store 18 for one or more users (typically for many users). Notably, the message store 18 is, at least in some embodiments, a CMS and, in particular, a CMS for CPM/RCS, which is sometimes referred to herein as a CPM/RCS message store. Further, the message store 18 is not limited to CPM/RCS, but may more generally be any type of CMS.

The server system 14 may be implemented as a single server computer (which includes processor(s), memory, etc.) or as multiple server computers (each including its own processor(s), memory, etc.) that operate in a collaborative manner, e.g., for purposes of load sharing and/or redundancy. The CMS server 16 is, at least in some embodiments, implemented in software. For example, the CMS server 16 may be implemented as software hosted on the server system 14, where the server system 14 is an enterprise-scale general computing platform such as a Unix server, a cluster of Unix servers, or a virtualized (cloud) server environment.

The system 10 also includes client devices 20-1 through 20-N (generally referred to herein collectively as client devices 20 and individually as client device 20). The client devices 20 may include smart phones, tablet computers, personal computers, and/or the like. In general, the client devices 20 may include any devices that are capable of communicating directly or indirectly with the server system 14 (e.g., through a 3$^{rd}$ Generation Partnership Project (3GPP) radio access network, a Wi-Fi network, fixed access internet connections, or the like). The client devices 20-1 through 20-N include respective clients 22-1 through 22-N (generally referred to herein collectively as clients 22 and individually as client 22). The clients 22 are implemented in software and operate to communicate with the CMS server 16 for purposes of, e.g., archiving messages and synchronizing mailboxes, as described below. Note that a particular user may own or operate multiple client devices 20, and the respective clients 22 operate, together with the CMS server 16, to synchronize mailboxes of that user in the message store 18 across the multiple client devices 20 of that user.

Figure 2:
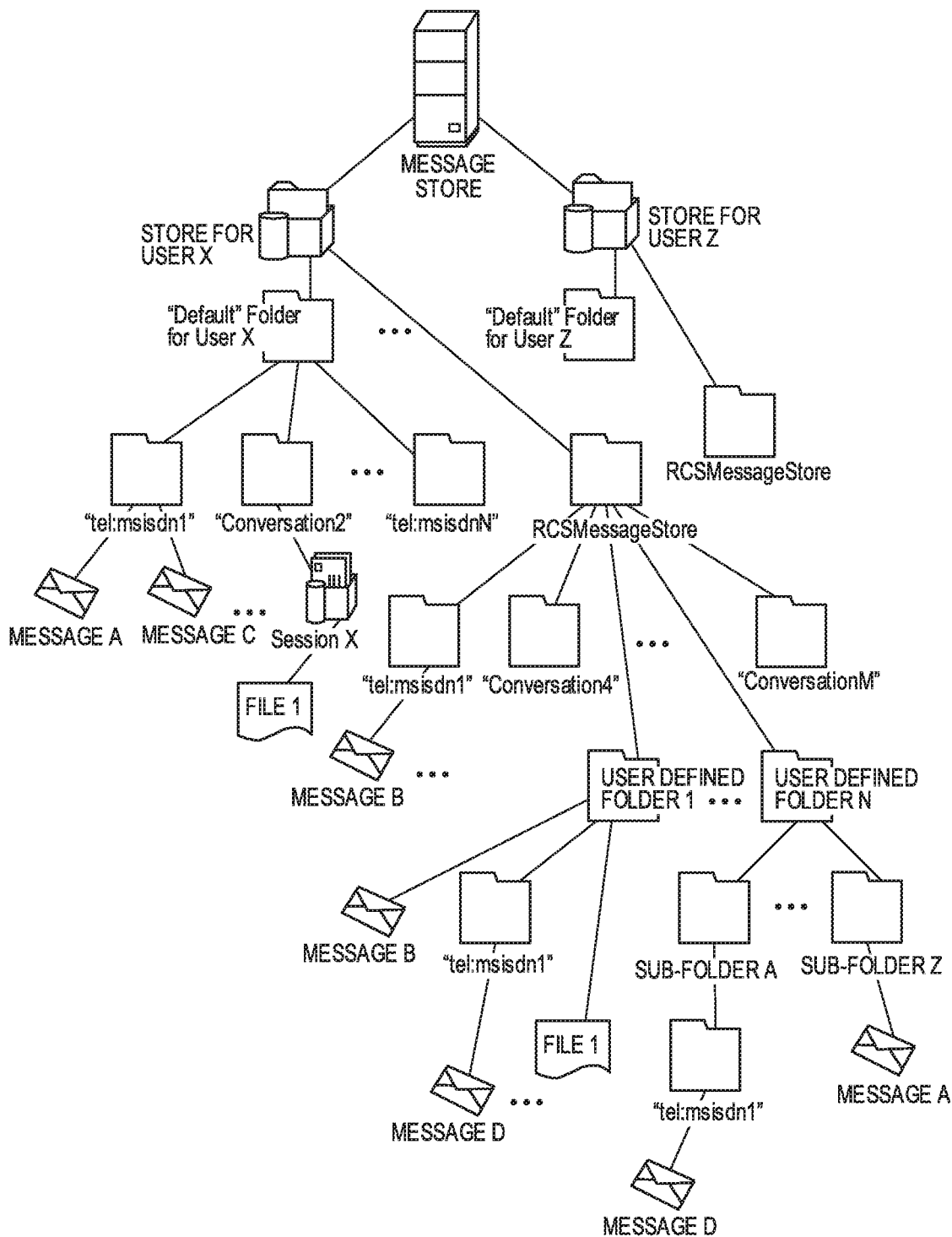
FIG. 2 illustrates a structure of a conventional implementation of a CMS for Converged Internet Protocol Messaging (CPM)/Rich Communication Services (RCS)

Before describing embodiments of the present disclosure, a brief description of structure of a conventional implementation of a CMS message store for CPM/RCS as well as a description of conventional archiving and synchronization processes when using the conventional implementation of the CMS message store for CPM/RCS is beneficial. In this regard, FIG. 2 illustrates the conventional implementation of a CMS message store for CPM/RCS. As illustrated, the conventional CMS message store includes user-specific message stores for multiple users, which are referred to herein as users X through Z. For each user, the user-specific message store includes a "Default" folder, which is also referred to herein as a Default mailbox, and an "RCSMessageStore" folder, which is also referred to herein as a RCSMessageStore mailbox.

Note that messages are referred to herein as being stored in the Default folder/mailbox for clarity and ease of discussion. However, just to be clear, the messages are more precisely stored in a mailbox hierarchically located below the Default folder, such as "Default/17783737245" or even deeper. These various mailboxes are referred to herein as being Default mailboxes. The same is true for the RCSMessageStore.

Figure 3:
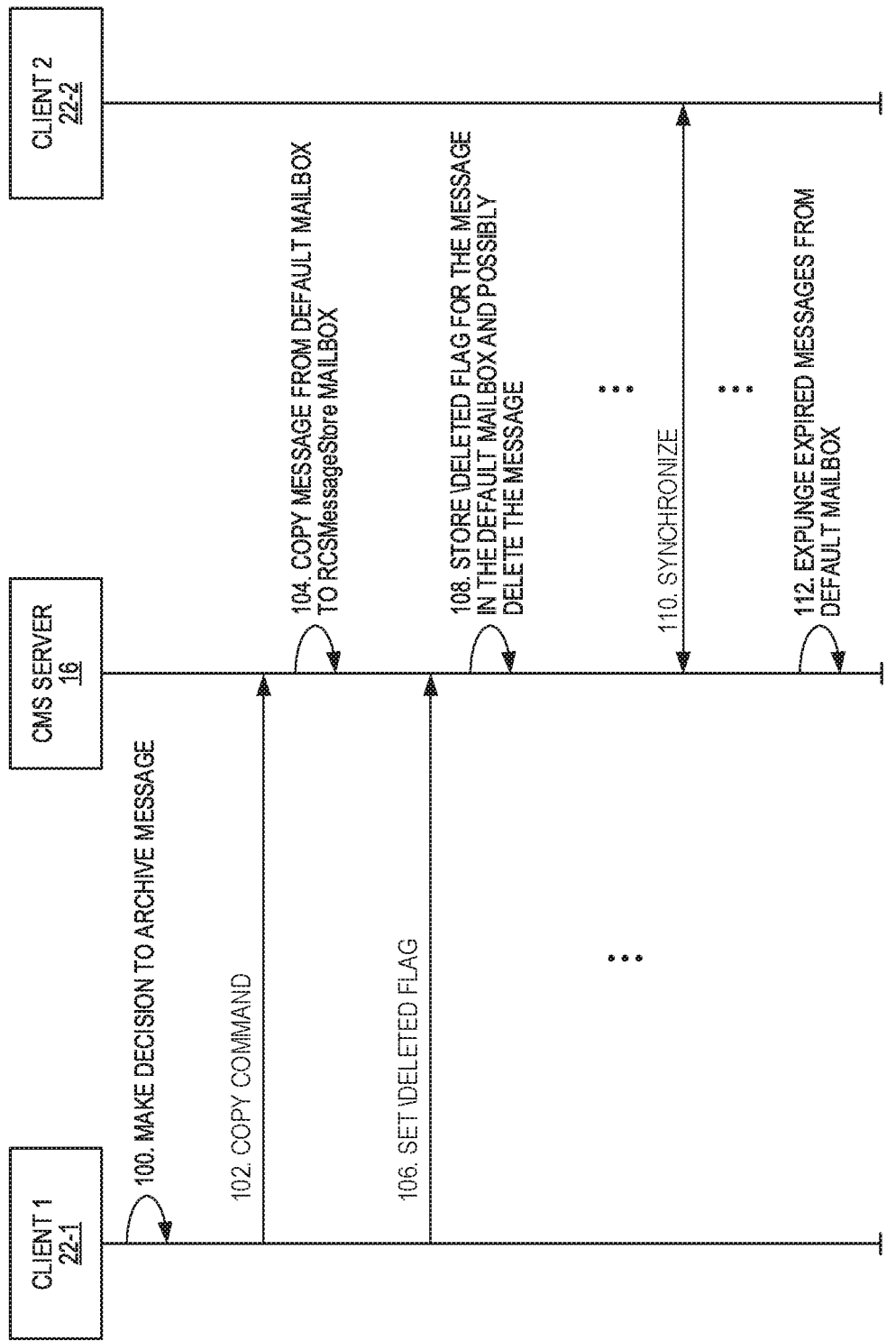
FIG. 3 illustrates a conventional message archiving process when utilizing the conventional implementation of a CMS for CPM/RCS.

In RCS, the Default mailbox has the characteristic of automatically expunging messages after a certain expiry period. In other words, in the conventional CMS message store for CPM/RCS, messages in the Default mailbox are automatically expunged after a certain, predefined expiry period. In order to keep messages from being expunged (i.e., in order to permanently store messages that, e.g., the user does not wish to be expunged), the messages that are desired for permanent storage are copied from the Default mailbox to the RCSMessageStore mailbox. This process is illustrated in FIG. 3. As shown, assuming that the system 10 of FIG. 1 uses the conventional CMS message store for CPM/RCS, a first client 22-1 of a user makes a decision to archive a message in the Default mailbox (step 100). This decision may be made, for example, based on explicit or implicit actions of the user. Upon making this decision, the client 22-1 sends a copy command to the CMS server 16 to copy the message from the Default mailbox to the RCSMessageStore mailbox (step 102). In other words, the client 22-1 sends an indication to the CMS server 16 that the message is to be copied from the Default mailbox to the RCSMessageStore mailbox. Upon receiving the copy command, the CMS server 16 copies the message from the Default mailbox of the user to the RCSMessageStore mailbox of the user in the message store 18 (which for this example is assumed to be a conventional CMS for CPM/RCS) (step 104). The client 22-1 then sets the \Deleted flag for the message in the Default mailbox (step 106). The CMS server 16 stores the \Deleted flag for the message in the Default mailbox and possibly deletes the message from the Default mailbox of the user (step 108).

Sometime thereafter, a second client 22-2 of the user synchronizes its local message store (which is referred to herein as a local copy of the message store 18) of the user with the message store 18 (step 110). An issue arises in that, when the message was copied from the Default mailbox of the user to the RCSMessageStore mailbox of the user in the message store 18, the message is assigned a new Unique Identifier (UID), which is required in RCS when copying messages such that messages across all mailboxes are unique. As a result, when synchronizing the local copy of the RCSMessageStore, the client 22-1 fetches the message having the new UID from the RCSMessageStore of the user. Because the message has a new UID, the message is not explicitly known to be the same message as was previously in the Default mailbox of the user. In order to address this issue, conventionally, the client 22-2 must attempt to correlate the message having the new UID that is stored in the local copy of the RCSMessageStore of the user during synchronization with the corresponding message in the local copy of the Default mailbox of the user. This gives rise to undesired complexity during synchronization.

In this example, sometime thereafter, the CMS server 16 expunges messages from the Default mailbox(es) of the user(s) (step 112). However, any archived messages have been copied to the RCSMessageStore mailbox(es) of the user(s) and, as such, will be maintained in the RCSMessageStore mailbox(es) of the user(s). Thus, by use of the copy command and the RCSMessageStore, messages can be permanently stored.

Figure 4A:
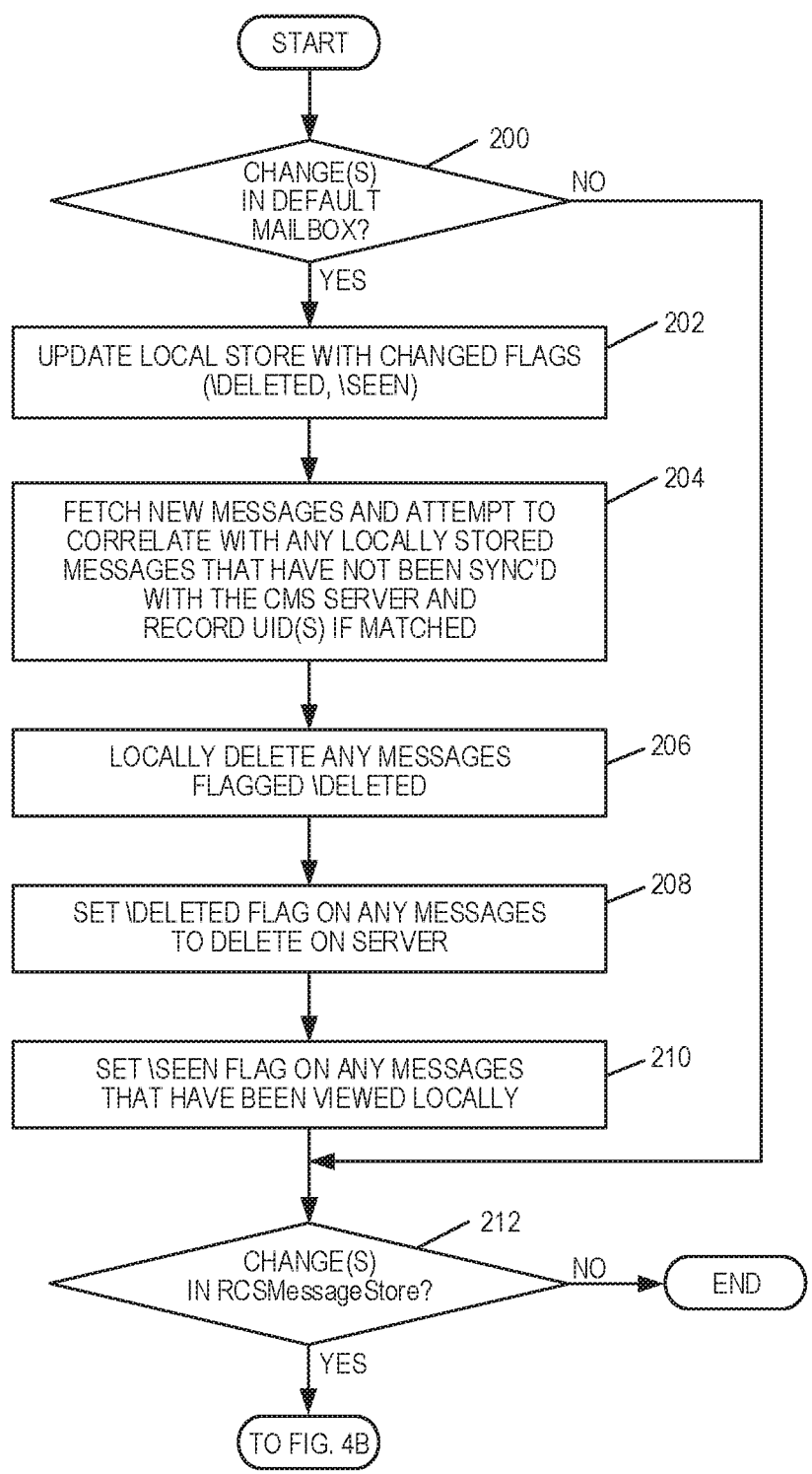
FIGS. 4A and 4B illustrate a conventional synchronization process when utilizing the conventional implementation of a CMS for CPM/RCS.
Figure 4B:
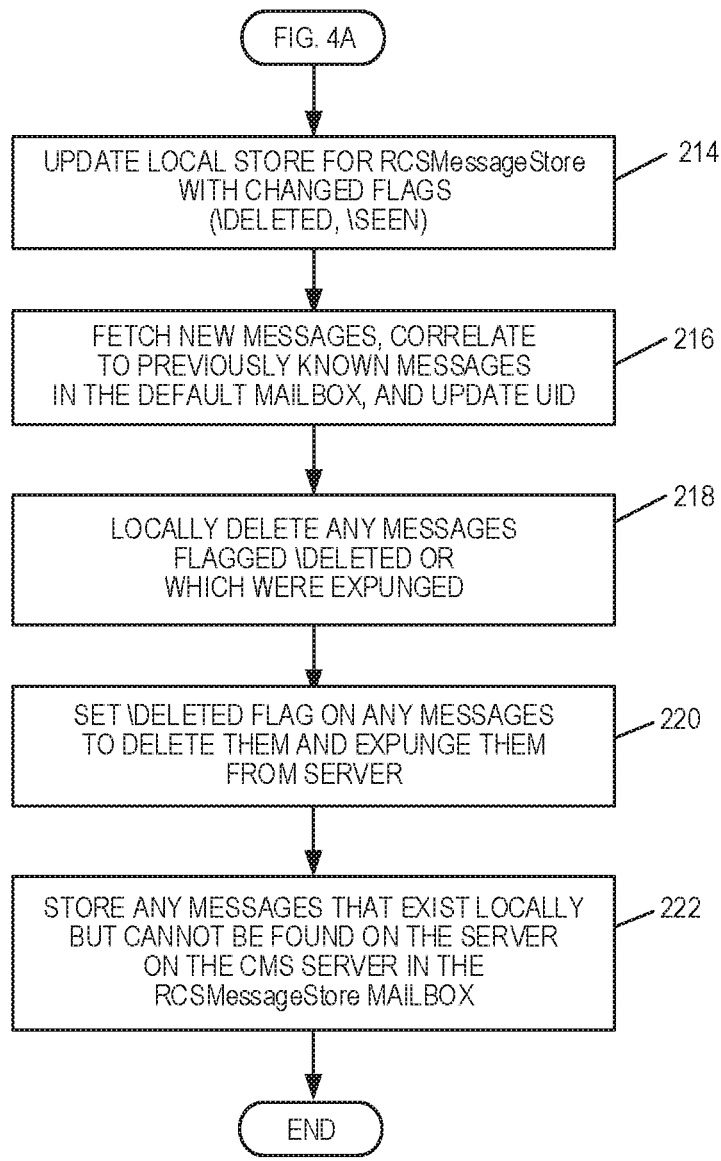

A synchronization process for the message store 18 when implemented as a conventional CMS for CPM/RCS is illustrated in FIGS. 4A and 4B. Note that FIGS. 4A and 4B illustrate the process for a single Default mailbox and its corresponding RCSMessageStore mailbox. However, this process may be repeated for each of multiple Default mailboxes and their corresponding RCSMessageStore mailboxes. In other words, FIGS. 4A and 4B illustrate step 110 of FIG. 3 in more detail. The client 22-2 first determines whether there have been changes in the Default mailbox of the user (step 200). In other words, the client 22-2 determines whether there are any changes either to the local copy of the Default mailbox of the user stored at the client device 20-2 or the Default mailbox of the user stored in the message store 18. If not, the process proceeds to step 212.

If there have been changes in the Default mailbox, the client 22-2 updates the local store of the Default mailbox with any changed flags (i.e., \Deleted or \Seen flags) for the respective messages (step 202) and fetches any new messages from the Default mailbox of the user in the message store 18 (step 204). In addition, with respect to any new messages fetched from the Default mailbox of the user in the message store 18, the client 22-2 attempts to correlate those messages with locally stored messages that have not yet been synchronized with the message store 18 via the CMS server 16. If there are any matches, the UIDs of the matching messages are recorded.

In addition, the client 22-2 locally deletes any messages flagged with the deleted flag from the local copy of the Default mailbox of the user (step 206). The client 22-2 also sets deleted flags on any messages to delete from the Default mailbox of the user in the message store 18 via the CMS server 16 (e.g., as a result of an action taken by the user at the client device 20-2 to delete those messages) (step 208). Similarly, the client 22-2 sets seen flags on any messages that have been viewed locally at the client device 20-2 (step 210).

Whether proceeding from the "NO" branch of step 200 or from step 210, the client 22-2 determines whether there have been changes in the RCSMessageStore mailbox of the user (step 212). In other words, the client 22-2 determines whether there are any changes either to the local copy of the RCSMessageStore mailbox of the user stored at the client device 20-2 or the RCSMessageStore mailbox of the user stored in the message store 18. If not, the synchronization process ends.

If there have been changes in the RCSMessageStore mailbox, the client 22-2 updates the local store of the RCSMessageStore mailbox with any changed flags (i.e., \Deleted or \Seen flags) for the respective messages (step 214) and fetches any new messages from the RCSMessageStore mailbox of the user in the message store 18 (step 216). In addition, with respect to any new messages fetched from the RCSMessageStore mailbox of the user in the message store 18, the client 22-2 attempts to correlate those messages with previously known messages in the Default mailbox of the user. If there are any matches, the UIDs of the previously known messages are updated to the new UIDs of corresponding messages in the RCSMessageStore mailbox.

In addition, the client 22-2 locally deletes any messages flagged with the deleted flag or that were expunged by the CMS server 16 from the local copy of the RCSMessageStore mailbox of the user (step 218). The client 22-2 also sets deleted flags on any messages to delete from the RCSMessageStore mailbox of the user in the message store 18 via the CMS server 16 (e.g., as a result of an action taken by the user at the client device 20-2 to delete those messages) (step 220). The client 22-2 may send an expunge command to the CMS server 16 for the RCSMessageStore mailbox such that the CMS server 16 will expunge messages with deleted flags set from the RCSMessageStore mailbox.

The client 22-2 stores any messages that exist locally at the client device 20-2 but cannot be found in the message store 18 via the CMS server 16 (step 222). In other words, any messages that exist locally and cannot be found in the Default or RCSMessageStore mailboxes of the user in the message store 18 are then stored in the RCSMessageStore of the user in the message store 18 via the CMS server 16. Note that this is related to the situation where a new message has been recently sent or received by the client 22-2 and which was not found on the CMS server 16 when the client 22-2 synchronized to the message store 18. This does not relate to messages stored locally at the client 22-2 that are not in the message store 18 because they have been deleted from the message store 18.

As discussed above, when a conventional implementation of the message store 18 for CPM/RCS and a conventional archival and synchronization process are used, an issue arises when attempting to synchronize the message store 18 of a user across multiple client devices 20 when a message(s) has been archived and, therefore, copied from the Default mailbox of the user to the RCSMessageStore mailbox of the user. When copying a message to the RCSMessageStore mailbox for archival, the message is assigned a new UID. As a result, during synchronization, a client 22 implemented on the client device 20 must attempt to correlate the message in the RCSMessageStore mailbox (which has a new UID) with a local copy of the message at the client device 20 that is stored in the Default mailbox. This creates undesired complexity for the synchronization process.

Figure 5:
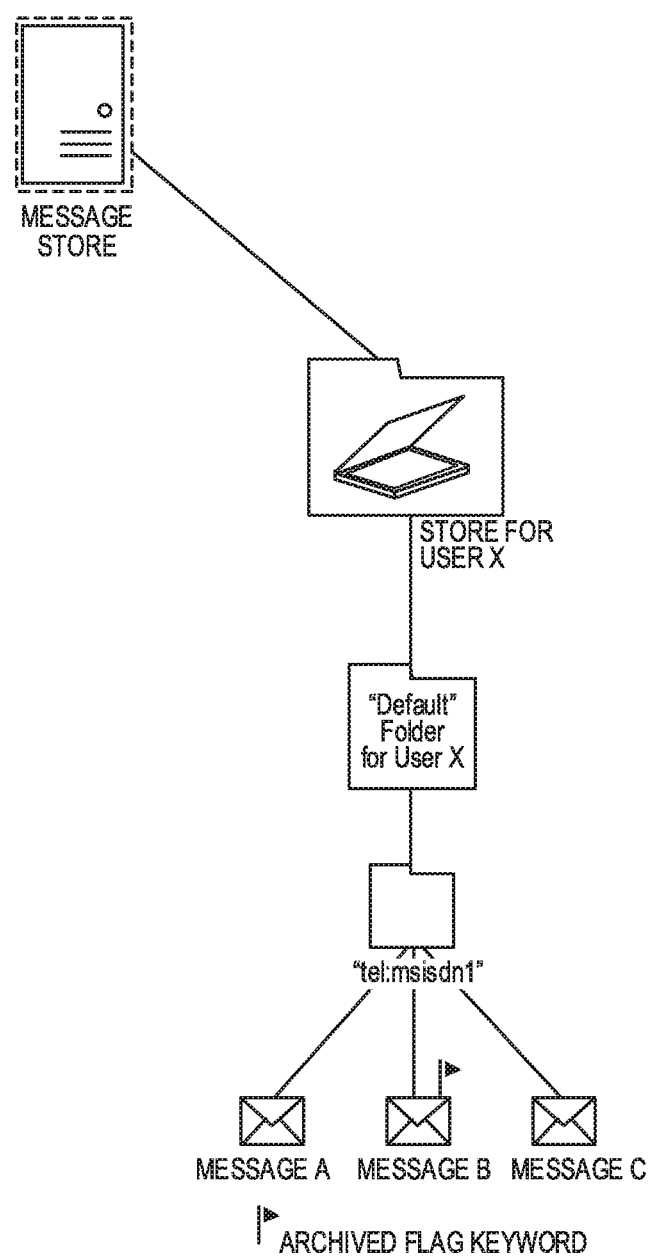
FIG. 5 illustrates one example of a structure of a CMS for CPM/RCS in which messages are archived within a Default mailbox utilizing an Archived flag, rather than copying the messages to a secondary mailbox (e.g., an RCSMessageStore mailbox), according to some embodiments of the present disclosure.

In order to address this issue, embodiments of a new structure for the message store 18 are disclosed along with embodiments of a new archiving and synchronization process that are based on the use of an "Archived" flag without copying or moving messages to a secondary mailbox (e.g., RCSMessageStore). As with the other flags (e.g., the \Deleted flag and the \Seen flag), the Archived flag is a message specific flag (i.e., the Archived flag applies on a per-message basis). In addition, in Internet Message Access Protocol (IMAP), the Archived flag is a "permanent" flag, where, in IMAP, a permanent flag is a flag that will be persisted such that other IMAP sessions will see those flags at a later time. In this regard, FIG. 5 illustrates a structure for the message store 18 according to some embodiments of the present disclosure. As illustrated, the message store 18 includes a Default mailbox for a user (user X), but, at least in some embodiments, does not include an RCSMessageStore mailbox for that user. As discussed below, messages in the Default mailbox of the user for which the Archived flag is not set are expunged after a predefined expiry time. Thus, by setting the Archived flag, the respective message can avoid being expunged from the Default mailbox. As a result, archived messages are not assigned a new UID and synchronization is greatly simplified.

Figure 6:
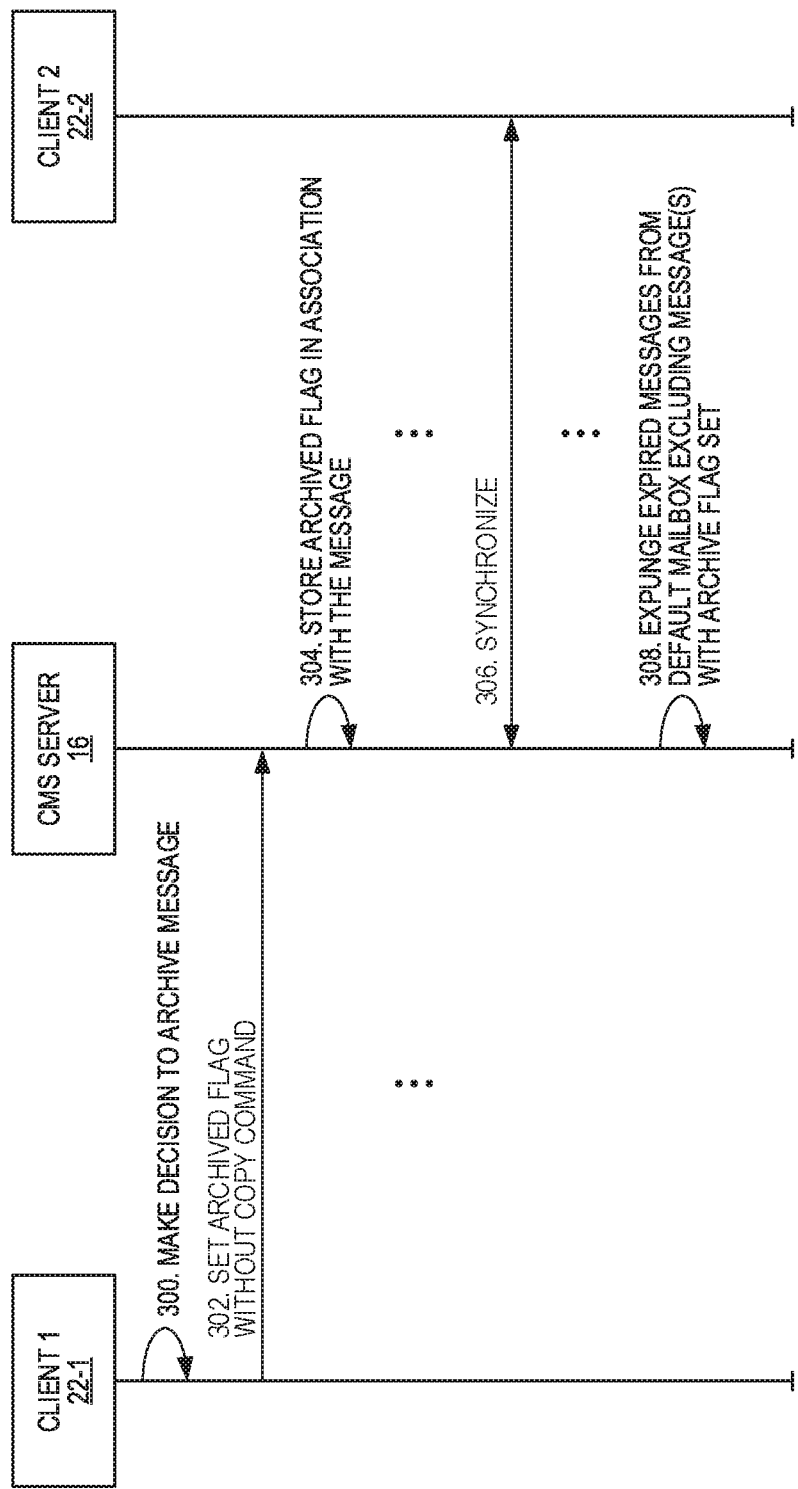
FIG. 6 illustrates a message archiving and synchronization process according to some embodiments of the present disclosure.

FIG. 6 illustrates the operation of the system 10 of FIG. 1 to provide archival of messages using an Archived flag according to some embodiments of the present disclosure. Here, the message store 18 is a CMS and, preferably, a CMS that uses the new CPM/RCS message store structure of FIG. 5. Further, it should be noted that while the description herein focuses on the archiving of a single message for simplicity and ease of discussion, it should be understood that, when archiving the message, it may be necessary or desired to also archive one or more associated messages (e.g., copying one message from the Default mailbox to the RCSMessageStore typically also requires the copying of some special messages (e.g., Session Info Objects, Group State Objects, and/or Instant Message Disposition Notification (IMDN) Objects) associated with that message to the RCSMessageStore). Thus, it should be understood that when an archive flag of a message is set, the archive flag of one or more associated messages may also be set. This is a further benefit over the conventional archiving process which requires copying the associated messages to the RCSMessageStore and where this copying of the associated messages further complicates the conventional synchronization process because each associated message is also assigned a new UID.

As shown, a first client 22-1 of a user makes a decision to archive a message in the Default mailbox (step 300). Note that while the Default mailbox is used here, it should be noted that the Default mailbox may be any mailbox for which messages are automatically expunged after a predefined expiry period. The decision to archive the message may be made, for example, based on explicit or implicit actions of the user. For example, the client 22-1 may receive input from the user that explicitly requests that the message be archived.

Upon making the decision to archive the message, the client 22-1 sets an Archived flag of the message (step 302). In other words, the client 22-1 sends an indication to the CMS sever 16 to set the Archived flag for the message in the Default mailbox of the user in the message store 18. Importantly, the client 22-1 sets the Archived flag without sending a copy or move command to move the message from the Default mailbox to some secondary mailbox (e.g., an RCSMessageStore mailbox). As a result, the message for which the Archived flag is set remains in the Default mailbox and keeps the same UID.

Upon receiving the indication from the client 22-1 to set the Archived flag for the message, the CMS server 16 stores the set Archived flag in association with the message in the Default mailbox of the user in the message store 18 (step 304). With respect to RCS, the Archived flag may be implemented as a new metadata flag (e.g., "Archived") associated with messages. In this case, the Archived flag may be set using the STORE command. This new metadata flag is an IMAP flag, so a new "keyword" is published by the IMAP server in FLAGS/PERMANENTFLAGS responses to SELECT and EXAMINE commands. Further, in some embodiments, the message size of the archived message is included in the quota usage, if a quota is being enforced for archived messages. If a quota is being enforced, then the CMS server 16 may reject the archival of the message if doing so would cause the quota for archived messages to be exceeded.

Sometime thereafter, a second client 22-2 of the user synchronizes its local copy of the message store 18 of the user with the message store 18 (step 306). In this case, since any archived messages remain in the Default mailbox of the user, the problem caused by moving archived messages to the RCSMessageStore that occurs in the conventional CMS for CPM/RCS is avoided. Rather, the second client 22-2 simply finds changes to the Archived flag within the Default mailbox of the user. Note that, for RCS, archiving in this way also simplifies the management of Session Information Objects (SIOs) and Group State Objects (GSO) for chat 1-1 and group chat since SIOs (for chat 1-1 and group chat) and GSOs (for group chat) no longer need to be copied to RCSMessageStore.

In this example, sometime thereafter, the CMS server 16 expunges messages from the Default mailbox(es) of the user(s) (step 308). However, any messages for which the respective Archived flag is set are not expunged from the Default mailbox(es). Thus, by setting the Archived flag, messages can be permanently stored in the Default mailbox(es) of the user(s).

Note that, in the example embodiments described herein, the Archived flag is initially not set (i.e., messages are not archived by default). As such, the client 22-1 decides whether a message is to be archived and, if so, sets the respective Archived flag, as described above with respect to FIG. 6. However, it should be noted that the use of the term "Archived flag" should be understood as meaning any flag that directly or indirectly indicates whether the message is to be archived. For example, the Archived flag may, in some alternative embodiments, be a metadata flag "Let Message Expire," where this embodiment of the Archived flag is initially in a state that indicates that the message is permitted to expire (i.e., "Let Message Expire" flag is positively set to indicate that the message is permitted to be automatically expunged upon expiry). Then, if the client 22-1 decides that the message is to be archived, the client 22-1 sets this embodiment of the Archived flag to a state that indicates that the message is to be archived (i.e., "Let Message Expire" flag is negatively set, or cleared, to indicate that the message is not permitted to be automatically expunged upon expiry (i.e., the message is to be archived)). Thus, the use of the phrase "set the Archived flag" is to be understood to cover both of the aforementioned embodiments of the Archived flag.

Also note that while FIG. 6 relates to archiving a message, the client 22-1 may similarly unarchive a message. For instance, if the client 22-1 determines that an archived messages is no longer to be archived, the client 22-1 may send an indication to the CMS server 16 to unset the Archived flag for the respective message. The CMS server 16 then removes the Archived flag for the message and, if the expiry period has expired, the CMS server 16 will expunge the message from the Default mailbox, e.g., during the next automatic expunging procedure. If the expiry period has not expired, the message will remain in the Default mailbox until the expiry period has expired, assuming that the Archived flag is not re-set.

Figure 7:
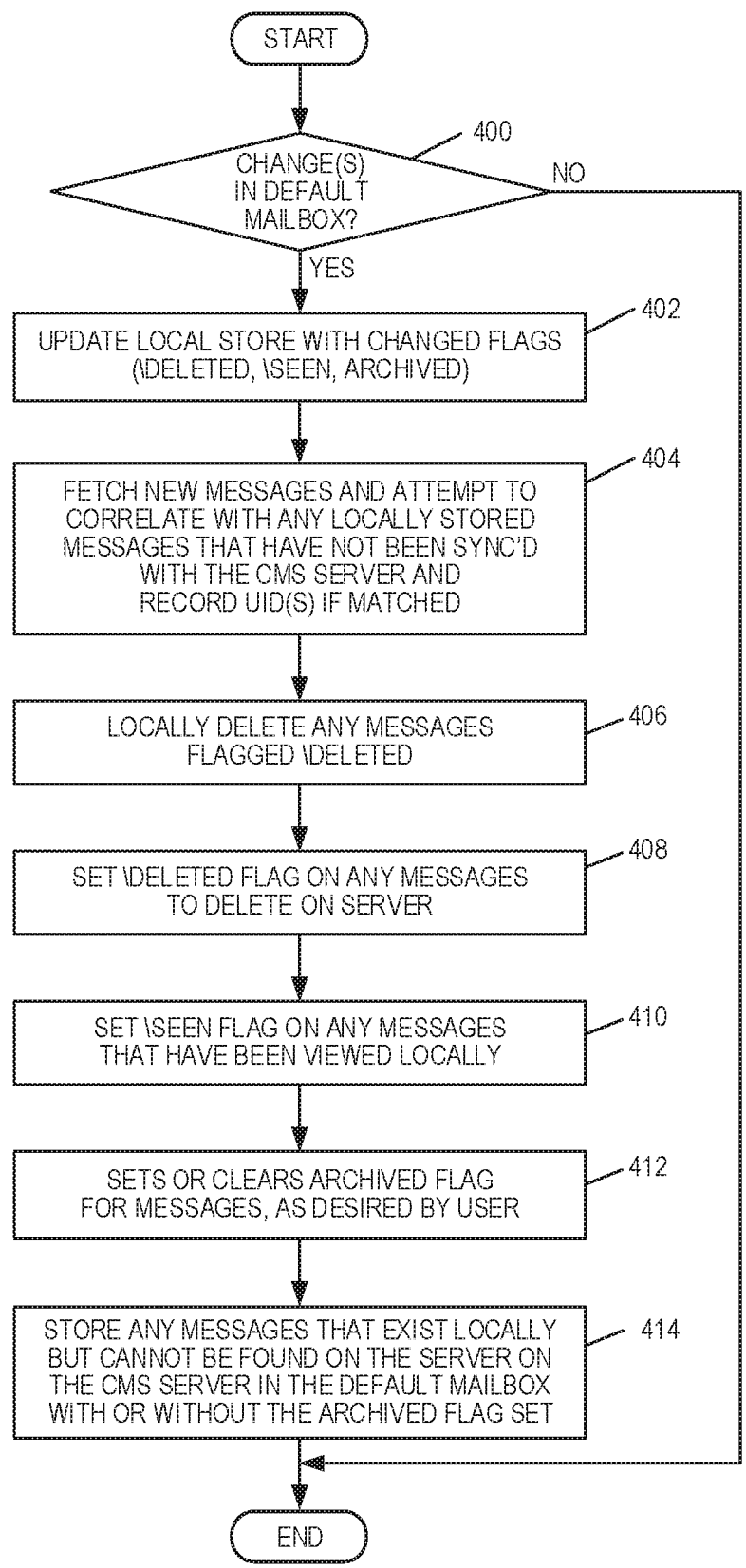
FIG. 7 is a more detailed illustration of a synchronization process according to some embodiments of the present disclosure.

FIG. 7 illustrates the synchronization process of step 306 of FIG. 6 in more detail according to some embodiments of the present disclosure. The client 22-2 first determines whether there have been changes in the Default mailbox of the user (step 400). In other words, the client 22-2 determines whether there are any changes either to the local copy of the Default mailbox of the user stored at the client device 20-2 or the Default mailbox of the user stored in the message store 18. If not, the process ends.

If there have been changes in the Default mailbox, the client 22-2 updates the local store of the Default mailbox with any changed flags (i.e., \Deleted, \Seen, or Archived flags) for the respective messages (step 402) and fetches any new messages from the Default mailbox of the user in the message store 18 (step 404). In addition, with respect to any new messages fetched from the Default mailbox of the user in the message store 18, the client 22-2 attempts to correlate those messages with locally stored messages that have not yet been synchronized with the message store 18 via the CMS server 16. If there are any matches, the UIDs of the matching messages are recorded.

In addition, the client 22-2 locally deletes any messages flagged with the deleted flag from the local copy of the Default mailbox of the user (step 406). The client 22-2 also sets deleted flags on any messages to delete from the Default mailbox of the user in the message store 18 via the CMS server 16 (e.g., as a result of an action taken by the user at the client device 20-2 to delete those messages) (step 408). Similarly, the client 22-2 sets seen flags on any messages that have been viewed locally at the client device 20-2 (step 410).

The client 22-2 sets or clears the Archived flag for any message(s), as desired by the user (step 412). For example, if the user desires to archive any message(s) for which the Archived flag has not yet been set, the client 22-2 sets the Archived flag for the message(s), as described above. Similarly, if the user desires to not archive any message(s) for which the Archived flag is set, the client 22-2 clears, or unsets, the Archived flag for the message(s).

The client 22-2 stores any messages that exist locally at the client device 20-2 but cannot be found in the Default mailbox of the user in the message store 18 via the CMS server 16 (step 414). In other words, messages that exist locally (but had never been stored in the message store 18) and cannot be found in the Default mailbox of the user in the message store 18 are then stored in the Default mailbox of the user in the message store 18 via the CMS server 16. Note that if an existing message is marked for archiving at the client 22-2 after the CMS server 16 expired the message, then the client 22-2 will write this message back into the Default mailbox of the user in the message store 18 and setting the Archived flag of the message (and the message would get a new UID). Note that the message can be stored directly with the Archived flag using, for example, the IMAP APPEND command. When storing the messages in step 414, the messages may be stored with or without the respective Archived flags set, depending on the particular embodiment.

The discussion of FIGS. 6 and 7 relate to archiving and synchronization. Once a message is archived, a user may desire to delete the archived message. In some embodiments, the previously archived message is deleted by setting the \Deleted flag for the message and explicitly expunging messages with the \Deleted flag from the Default mailbox or sending a command (e.g., the UID EXPUNGE command) to expunge the specific message. In other embodiments, the client 22 clears the Archived flag for the message desired to be deleted. This message will then be automatically expunged once the expiry period has expired in the same manner as other non-archived messages in the Default mailbox.

In other embodiments, the client 22 clears the Archived flag for the previously archived message and sets the \Deleted flag for the message, but does not explicitly expunge the message. More specifically, RCS has a few requirements that are very specifically aimed at ensuring that messages which have been intentionally deleted from a client device 20 will promptly be removed from all other client devices 20 of that same user. Meanwhile, the client devices 20 are also required not to delete messages that are removed from the message store 18 of the CMS server 16 by expiry. This leads to some complicated scenarios.

These complicated scenarios are addressed by the client 22 both clearing the Archived flag for the previously archived message and setting the \Deleted flag for that message, preferably in one step, but not expunging the message from the Default mailbox. This leaves the message visible in the Default mailbox as having the \Deleted flag set, which signals to the clients 22 of the other client devices 20 of the user that this message must be removed from their local storage. This is addressing the following race condition:

1. Devices A and B both have synchronized and know about message X.
2. Device A sets the Archived flag of message X.
3. Device A later deletes message X.
4. Device B subsequently synchronizes.

In step 4, because device B did not know message X had been archived, it is important that device B will still remove message X from its local storage. If device B finds the \Deleted flag for message X, that will trigger device B to remove message X from its local storage. If device B did not find message X at all, device B might assume it had been expired by the CMS server 16 and, according to RCS, that it should then keep message X in its local storage.

Figure 8:
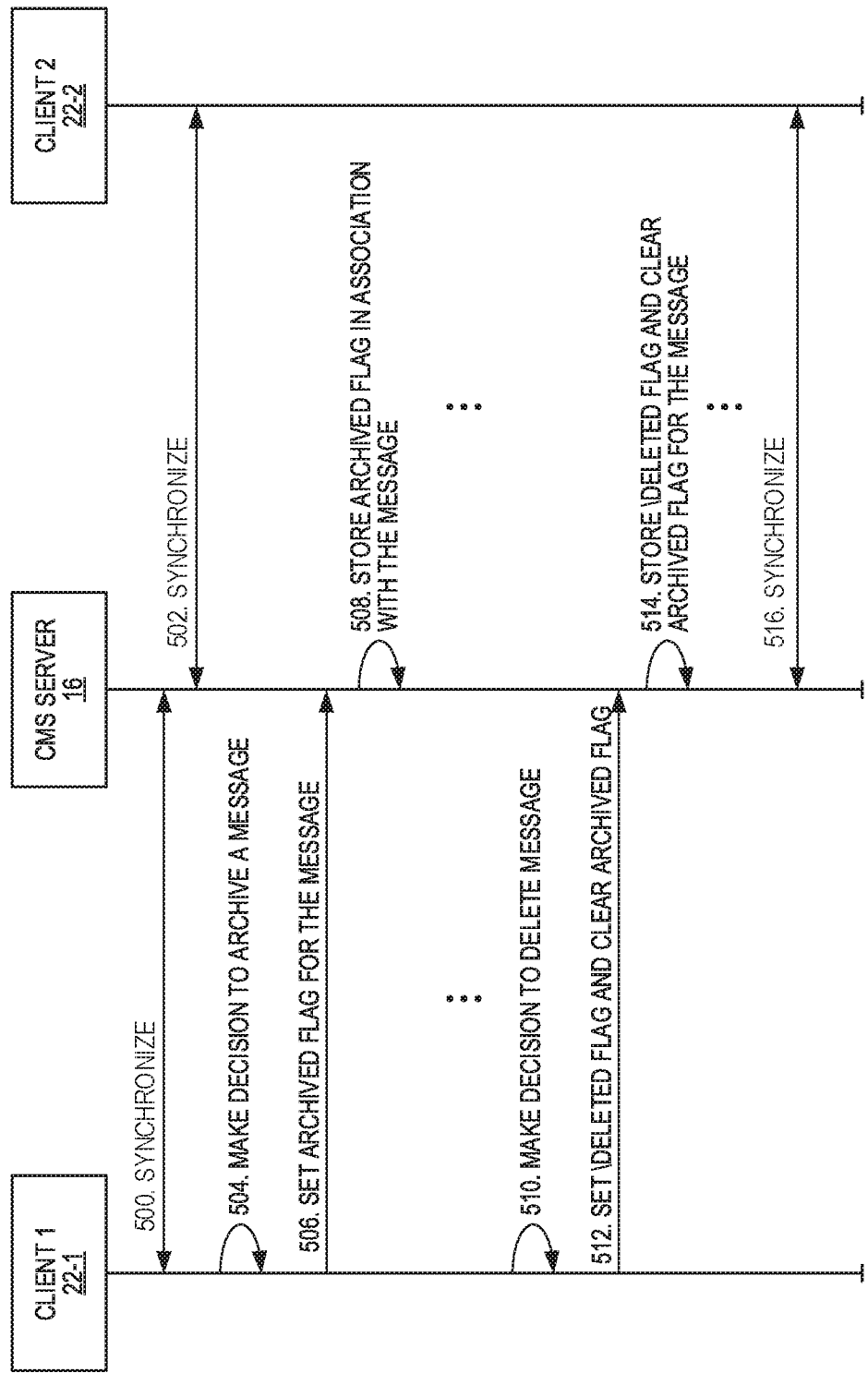
FIG. 8 illustrates a process for deleting a previously archived message according to some embodiments of the present disclosure.

This process is illustrated in FIG. 8. As shown, clients 22-1 and 22-2 of respective client devices 20-1 and 20-2 of a user both synchronize to the message store 18 via the CMS server 16 (steps 500 and 502). The client 22-1 makes a decision to archive a message and, upon making this decision, sets the Archived flag for that message, as described above (steps 504 and 506). The CMS server 16 stores the Archived flag in association with the message (step 508).

Sometime thereafter (but, in this example, before the client 22-2 synchronizes), the client 22-1 makes a decision to delete the same message that was previously archived (step 510). This decision may be made based on explicit or implicit actions of the user. Upon making the decision to delete the previously archived message, the client 22-1 sets the \Deleted flag and clears (i.e., unsets) the Archived flag for the message, preferably in a single step (e.g., in a single command or in two successive commands) (step 512). Importantly, the client 22-1 does not explicitly expunge the message. The CMS server 16 stores the \Deleted flag in association with the message and clears the Archived flag of the message (step 514). Note that, in some alternative embodiments, the client 22-1 sets the \Deleted flag in step 512, but does not clear the Archived flag. In these alternative embodiments, the \Deleted flag is given priority over the Archived flag and, as such, the message is a candidate for automatic expiry once the \Deleted flag has been set.

Sometime thereafter, the client 22-2 synchronizes to the message store 18 of the user via the CMS server 16 (step 516). Because the client 22-2 did not synchronize between the time that the message was archived and the time that the message was deleted, the client 22-2 is not aware that the message was previously archived. As such, if the message would have been expunged, then the client 22-2 would have kept the message in its local copy of Default mailbox of the user. However, since the message was not expunged, the client device 22-2 sees the message as having the \Deleted flag set and, as such, removes the message in its local storage according to RCS procedures.

Figure 9:
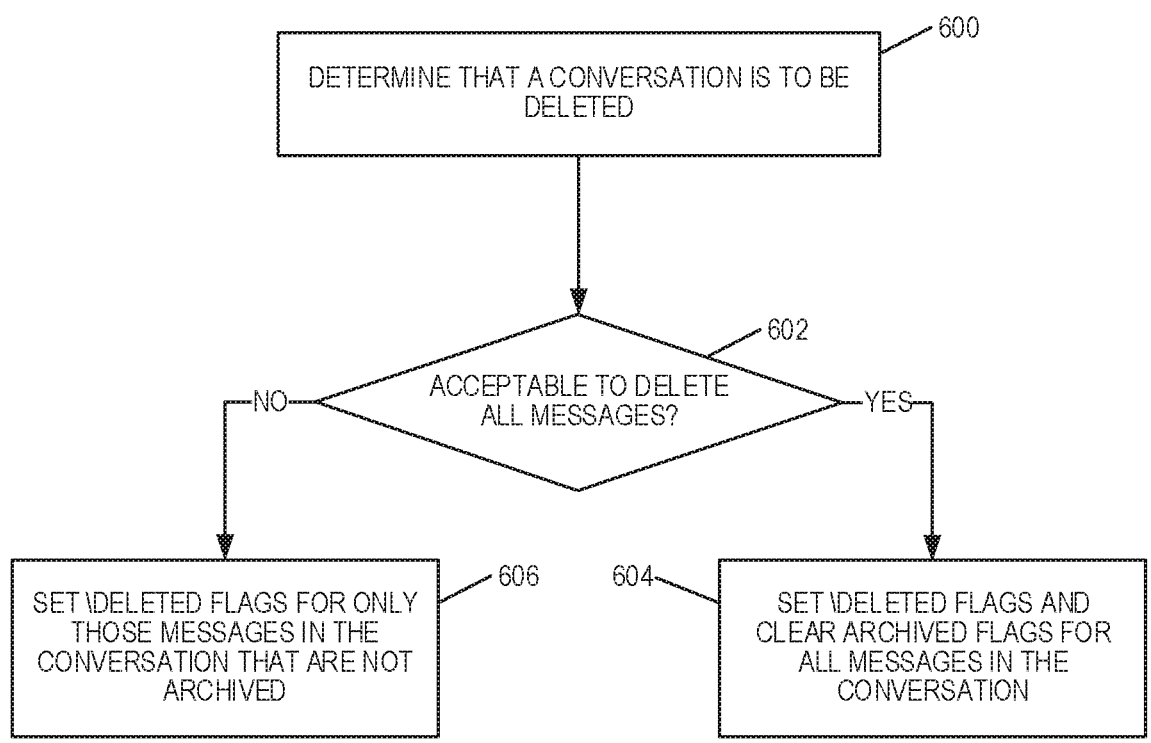
FIG. 9 illustrates a process for deleting a conversation, where a conversation includes many messages, according to some embodiments of the present disclosure.

While FIG. 8 relates to the deletion of a message, FIG. 9 illustrates a process performed by the client 22 with respect to deleting a conversation, where a conversation includes many messages, according to some embodiments of the present disclosure. In particular, within the Default folder of the user, the Default folder includes a separate mailbox for each of a number of "conversations" of the user. Thus, each conversation is a separate Default mailbox (i.e., a separate mailbox under the Default folder).

As illustrated, the client 22 determines that a conversation is to be deleted (step 600). This determination may be made based on, e.g., an explicit or implicit action of the user. The client 22 then prompts or otherwise requests an indication from the user regarding whether it is acceptable to delete every message in the conversation including any archived messages (step 602). If so, then the client 22 sets the \Deleted flag and clears the Archived flag (possibly only if needed) for each message in the conversation (step 604), in a manner similar to that described above with respect to FIG. 8. Otherwise, the client 22 sets the \Deleted flag only for those messages in the conversation that are not archived (i.e., do not have their respective Archived flags set) (step 606). In some embodiments, the client 22 fetches the UIDs and flags of the messages in the conversation or uses the QRESYNC command to obtain the latest changed flags for the messages in the conversation. Using the UIDs, the client 22 then stores the \Deleted flag for those messages in the conversation that do not have their respective Archived flag set.

Figure 10:
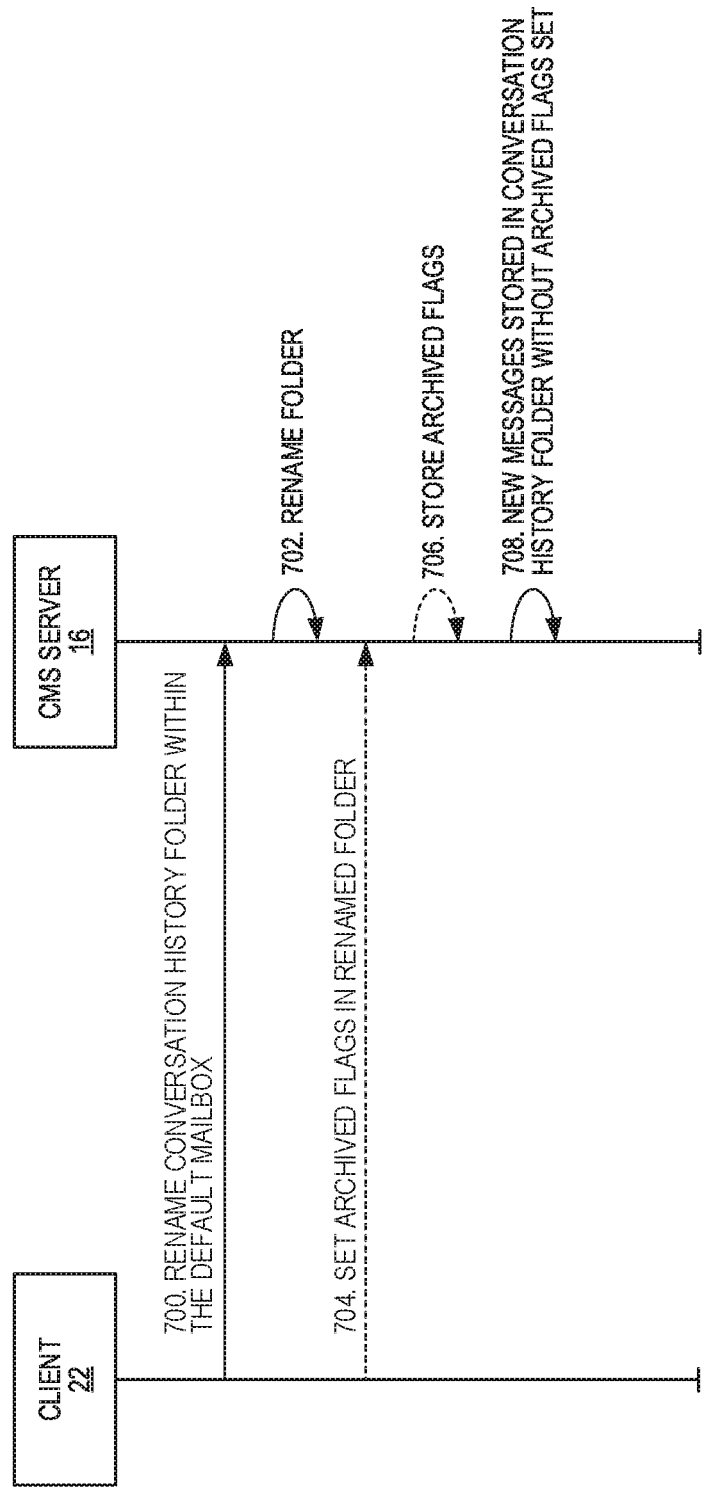
FIG. 10 illustrates a process for renaming/moving a Conversation History folder within a Default mailbox according to some embodiments of the present disclosure.

FIG. 10 illustrates a process for renaming a Conversation History folder within the Default mailbox according to some embodiments of the present disclosure. Note that the Default folder for a particular user includes a separate mailbox for each conversation of the user. Each of these mailboxes is referred to herein as a Default mailbox. The Default mailbox for a conversation includes a Conversation History folder that stores all messages in that conversation for that Default mailbox. In some scenarios, it may be desirable to rename the Conversation History folder. Conventionally, a renamed Conversation History folder would be moved to the RCSMessageStore. However, in the embodiment of FIG. 10, the Conversation History folder is moved within the Default mailbox. Messages in the moved Conversation History folder may be archived by setting and storing the respective Archived flags for the messages in the renamed Conversation History folder. Any new messages for the conversation are stored in the original Conversation History folder (i.e., not the renamed Conversation History folder) and the Archived flags for these new messages are not, by default, set.

As illustrated in FIG. 10, the client 22 sends a command to rename the Conversation History folder for the Default mailbox (step 700). The CMS server 16 then renames the Conversation History folder to some predefined or designated name (step 702). Optionally, if the messages in the renamed Conversation History folder are desired to be archived, the client 22 sends a command to set the Archived flags of the messages in the renamed Conversation History folder (step 704), and the CMS server 16 stores the Archived flags for those messages in the renamed Conversation History folder (step 706). The CMS server 16 stores any new messages for the conversation in the Conversation History folder for the Default mailbox (step 708). This Conversation History folder has the same name as the previous Conversation History folder prior to renaming.

Figure 11:
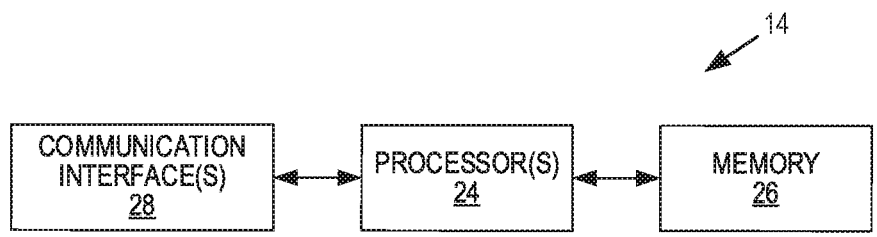
FIGS. 11 and 12 illustrate example embodiments of the server system of FIG. 1.

FIG. 11 illustrates the server system 14 according to some embodiments of the present disclosure. As illustrated, the server system 14 includes one or more processors 24 (e.g., one or more Central Processing Units (CPUs), one or more Application Specific Integrated Circuits (ASICs), one or more Field Programmable Gate Arrays (FPGAs), and/or the like), memory 26, and one or more communication interfaces 28 (e.g., network interfaces). In some embodiments, the server system 14 is a centralized system. In other embodiments, the server system 14 is a distributed system, in which case the processors 24, memory 26, and communication interfaces 28 may be distributed. In some embodiments, the functionality of the server system 14 and, in particular, the functionality of the CMS server 16 is implemented in software that is stored in the memory 26 and executed by the one or more processors 24.

In some embodiments, a computer program including instructions which, when executed by at least one processor, causes the at least one processor to carry out the functionality of the server system 14, and in particular the CMS server 16, according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 26).

Figure 12:
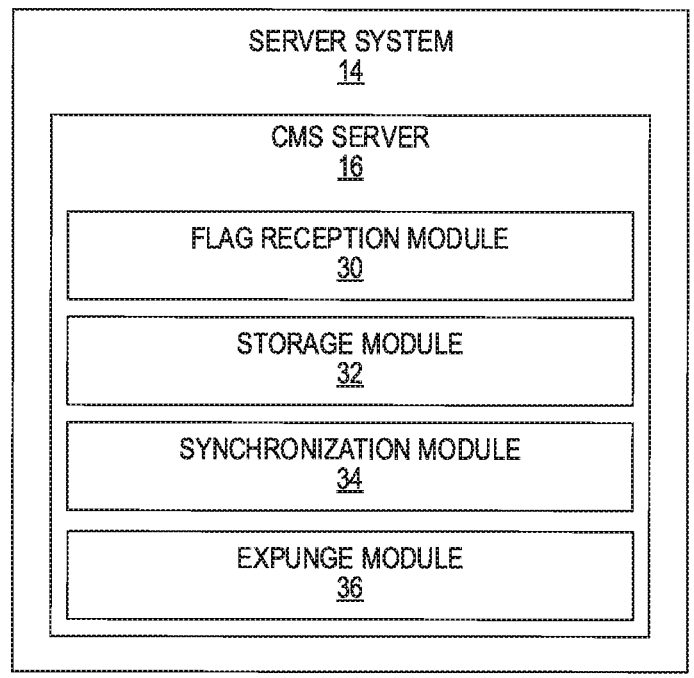

FIG. 12 illustrates the server system 14 according to some other embodiments of the present disclosure. As illustrated, the server system 14 includes the CMS server 16, where the CMS server 16 includes a flag reception module 30, a storage module 32, a synchronization module 34, and an expunge module 36, each of which is implemented in software. The flag reception module 30 operates to receive commands to set or clear the Archived flag for messages in the message store 18 (and possibly receives commands to set or clear other types of flags, e.g., a \Deleted flag and/or a \Seen flag), as described above. The storage module 32 operates to store (or clear) flags for messages in the message store 18, as described above. The synchronization module 34 operates to enable synchronization of the Default mailbox(es) of a user(s) across multiple client devices 20 of the user(s), as described above. The expunge module 36 operates to expunge messages automatically after expiry or, in some embodiments, upon explicit command from the client 22.

Figure 13:
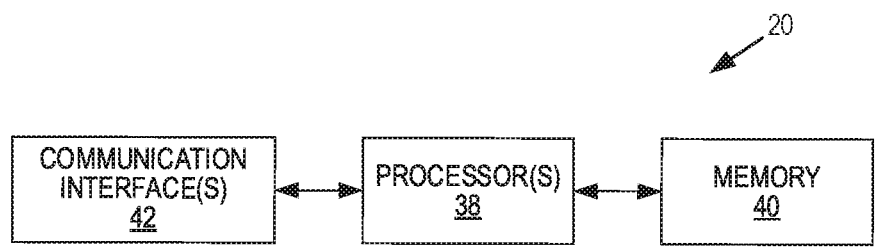
FIGS. 13 and 14 illustrate example embodiments of the client devices of FIG. 1.

FIG. 13 illustrates the client device 20 according to some embodiments of the present disclosure. As illustrated, the client device 20 includes one or more processors 38 (e.g., one or more CPUs, one or more ASICs, one or more FPGAs, and/or the like), memory 40, and one or more communication interfaces 42 (e.g., network interfaces). In some embodiments, the functionality of the client device 20 and, in particular, the functionality of the client 22 is implemented in software that is stored in the memory 40 and executed by the one or more processors 38.

In some embodiments, a computer program including instructions which, when executed by at least one processor, causes the at least one processor to carry out the functionality of the client device 20, and in particular the client 22, according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

Figure 14:
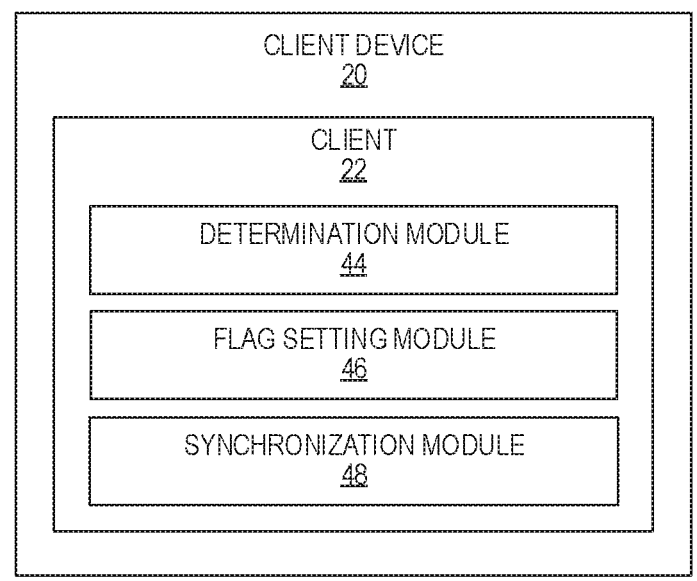

FIG. 14 illustrates the client device 20 according to some other embodiments of the present disclosure. As illustrated, the client device 20 includes the client 22, where the client 22 includes a determination module 44, a flag setting module 46, and a synchronization module 48, each of which is implemented in software. The determination module 44 operates to determine whether a message is to be archived or, in some embodiments, whether the Archived flag for previously archived message should be cleared, as described above. The flag setting module 46 operates to set flags (e.g., Archived flags and/or \Deleted flags and \Seen flags) for messages, as described above. The synchronization module 48 operates to synchronize with the message store 18, as described above.

The systems and methods described herein provide numerous advantages over conventional technology. While not being limited to or by any of these advantages, some examples are as follows. By simply using the Archived flag to identify whether messages should be kept long-term or not (i.e., whether messages should be deleted at expiry), the client device 20 interaction is dramatically simplified. For instance, the number of commands issued to archive a single message using IMAP protocol (after mailbox selection) drops from two commands to one command thereby removing a race condition with multiple clients 22 are concurrently synchronizing, and each subsequent client device's synchronization is simplified.

Another advantage is that deletion of a message is done in one mailbox versus potentially two different mailboxes in the current RCS mechanism. Another advantage is that un-archiving a message is also simplified for the client device 20, and allows a non-expired message to continue to be visible until it expires.

In addition, in embodiments where the client device 20 is a mobile device, the mobile device is very sensitive to power use due to limited battery life. The systems and methods described herein simplify synchronization and, as a result, reduce battery consumption by reducing the amount of time that the radio of the mobile device operates during synchronization (due to reduced amount of information exchanged).

On the server side, embodiments described herein reduce Input/Output (I/O) traffic, and shorten the synchronization time. Each of these aspects increases the number of client synchronization sessions that can be serviced within a given time interval.

The following acronyms are used throughout this disclosure.

3GPP 3$^{rd}$ Generation Partnership Project
ASIC Application Specific Integrated Circuit
CMS Common Message Store
CPM Converged Internet Protocol Messaging
CPU Central Processing Unit
FPGA Field Programmable Gate Array
GSM Global System for Mobile Communications, originally Groupe Speciale Mobile
GSMA Global System for Mobile Communications Association
GSO Group State Object
IMAP Internet Message Access Protocol
IMDN Instant Message Disposition Notification
IMS Internet Protocol Multimedia Subsystem
I/O Input/Output
IP Internet Protocol
OMA Open Mobile Alliance
RCS Rich Communication Services
SIO Session Information Object
SMS Short Message Service
UID Unique Identifier Those skilled in the art will recognize improvements and modifications to the embodiments of the present disclosure. All such improvements and modifications are considered within the scope of the concepts disclosed herein and the claims that follow.

What is claimed is:

1. A method of operation of a client device for archiving messages in a message store managed by a server, the method comprising:
   making a determination at the client device to archive a message that is stored in a first mailbox of the message store; and
   upon making the determination, sending an instruction to the server to set an Archived flag for the message without sending an instruction to the server to copy or move the message from the first mailbox of the message store to a second mailbox of the message store,
      wherein the Archived flag is a flag which indicates that the message is to be archived, and
      wherein the message stored in the first mailbox of the message store is expunged from the first mailbox of the message store after an expiry period, when the Archived flag is not set for the message.

2. The method of claim 1, wherein the message store is a Common Message Store (CMS) and the server is a CMS server.

3. The method of claim 2, wherein the CMS is a Converged Internet Protocol Messaging (CPM)/Rich Communication Services (RCS) message store.

4. The method of claim 1, wherein the Archived flag is a message-specific Archived flag.

5. The method of claim 1, wherein the Archived flag is a permanent flag.

6. The method of claim 1, wherein the first mailbox is a default mailbox.

7. The method of claim 6, wherein the message store is a Converged Internet Protocol Messaging (CPM)/a Rich Communication Services (RCS) message store, and sending the instruction to the server to set the Archived flag for the message comprises sending the instruction to the server to set the Archived flag for the message without sending the instruction to the server to copy or move the message from the default mailbox of the CPM/RCS message store to a RCSMessageStore mailbox of the CPM/RCS message store.

8. The method of claim 1, further comprising:
   making a determination to delete a previously archived message, the previously archived message being a message having an Archived flag that is set; and
   upon making the determination to delete the previously archived message, sending an instruction to the server to both set a deleted flag for the previously archived message and clear the Archived flag for the previously archived message.

9. The method of claim 8, wherein the client device does not send an instruction to the server to expunge deleted messages from the first mailbox or to specifically expunge the previously archived message.

10. The method of claim 8, wherein the previously archived message is the message that is stored in the first mailbox of the message store.

11. The method of claim 8, wherein the previously archived message is a message in the first mailbox other than the message that is stored in the first mailbox of the message store.

12. A client device enabled for archiving messages in a message store managed by a server, the client device comprising:
   one or more communication interfaces;
   one or more processors; and
   memory containing software instructions executable by the one or more processors whereby the client device is operable to:

make a determination at the client device to archive a message that is stored in a first mailbox of the message store; and upon making the determination, send an instruction to the server to set an Archived flag for the message without sending an instruction to the server to copy or move the message from the first mailbox of the message store to a second mailbox of the message store, wherein the Archived flag is a flag which indicates that the message is to be archived, and wherein the message stored in the first mailbox of the message store is expunged from the first mailbox of the message store after an expiry period, when the Archived flag is not set for the message.

13. A method of operation of a server system implementing a message store, the method comprising:

receiving, from a first client device, an instruction to set an Archived flag for a message that is stored in a first mailbox of the message store without receiving, from the first client device, an instruction to copy or move the message from the first mailbox of the message store to a second mailbox of the message store; and storing the Archived flag for the message, wherein the Archived flag is a flag which indicates that the message is to be archived, and wherein the message stored in the first mailbox of the message store is expunged from the first mailbox of the message store after an expiry period, when the Archived flag is not set for the message.

14. The method of claim 13, wherein the message store is a Common Message Store (CMS) and the server system comprises a CMS server.

15. The method of claim 14, wherein the CMS is a Converged Internet Protocol Messaging (CPM)/Rich Communication Services (RCS) message store.

16. The method of claim 13, wherein the Archived flag is a message-specific Archived flag.

17. The method of claim 13, wherein the Archived flag is a permanent flag.

18. The method of claim 13, wherein the first mailbox is a default mailbox.

19. The method of claim 18, wherein the message store is a Converged Internet Protocol Messaging (CPM)/a Rich Communication Services (RCS) message store, and receiving the instruction to set the Archived flag for the message comprises receiving the instruction to set the Archived flag for the message without receiving, from the first client device, the instruction to copy or move the message from the default mailbox of the CPM/RCS message store to a RCSMessageStore mailbox of the CPM/RCS message store.

20. The method of claim 19, wherein the server system does not expunge the message from the default mailbox even after an expiry period has expired for the message.

21. The method of claim 13, further comprising synchronizing the message store with a second client device.

22. The method of claim 21, wherein the message store is a Converged Internet Protocol Messaging (CPM)/a Rich Communication Services (RCS) message store, the first mailbox is a default mailbox, and the CPM/RCS message store does not comprise an RCSMessageStore mailbox.

23. A server system implementing a message store, the server system comprising:

one or more communication interfaces;

one or more processors; and memory containing software instructions executable by the one or more processors whereby the server system is operable to:

receive, from a first client device, an instruction to set an Archived flag for a message that is stored in a first mailbox of the message store without receiving, from the first client device, an instruction to copy or move the message from the first mailbox of the message store to a second mailbox of the message store; and store the Archived flag for the message, wherein the Archived flag is a flag which indicates that the message is to be archived, and wherein the message stored in the first mailbox of the message store is expunged from the first mailbox of the message store after an expiry period, when the Archived flag is not set for the message.

\* \* \* \* \*